US011280660B2

(12) United States Patent
Splichal, Jr. et al.

(10) Patent No.: US 11,280,660 B2
(45) Date of Patent: Mar. 22, 2022

(54) SYSTEM AND METHOD USING TIME-DOMAIN REFLECTOMETRY TO MEASURE A LEVEL OF A LIQUID

(71) Applicant: GE-Hitachi Nuclear Energy Americas LLC, Wilmington, NC (US)

(72) Inventors: William Francis Splichal, Jr., San Jose, CA (US); Yogeshwar Dayal, San Jose, CA (US); Jonathan R. Earnhart, Wilmington, NC (US); Andrew F. Fidler, Wilmington, NC (US); Steven D. Sawyer, San Jose, CA (US); Keith D. Requard, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 79 days.

(21) Appl. No.: 16/431,934

(22) Filed: Jun. 5, 2019

(65) Prior Publication Data

US 2020/0386603 A1    Dec. 10, 2020

(51) Int. Cl.
*G01F 23/296* (2006.01)
*G21C 17/035* (2006.01)
*G21C 17/112* (2006.01)
*G01F 23/2962* (2022.01)

(52) U.S. Cl.
CPC ....... *G01F 23/2962* (2013.01); *G21C 17/035* (2013.01); *G21C 17/112* (2013.01)

(58) Field of Classification Search
CPC ........ G01F 23/00; G01F 23/284; G01F 23/26; G01F 23/2962; G01F 23/0061; G01F 23/0076; G01F 23/263; G01F 22/00; G01F 23/296; G01F 25/0061; G01F 23/0069; G01F 23/14; G01F 23/18; G01F 23/22; G01F 23/242; G01F 23/268; G01F 23/0007; G01F 23/24; G01F 23/292; G01F 23/2921; G01F 23/2961; G01F 23/04;

(Continued)

(56) References Cited

U.S. PATENT DOCUMENTS 4,786,857 A    11/1988  Mohr et al.
9,074,922 B2 *  7/2015  Dayal ................... G01R 27/02
(Continued)

FOREIGN PATENT DOCUMENTS

JP    2013-124883    6/2013
JP    2016-194421    11/2016
(Continued)

OTHER PUBLICATIONS

Search Report for European Application No. 20178307.3 dated Oct. 28, 2020.

(Continued)

*Primary Examiner* — Andre J Allen
(74) *Attorney, Agent, or Firm* — Harness, Dickey & Pierce, PLLC

(57) ABSTRACT

A system for measuring a level of a liquid may include a receptacle, a probe, a pulsing unit, and a digitizer. The receptacle has a top and a bottom and is configured to contain the liquid. The probe may extend into the receptacle through the bottom. The pulsing unit is configured to transmit a pulse to the probe. The digitizer is configured to receive at least a first reflected pulse and a second reflected pulse from the probe. The time between the first reflected pulse and the second reflected pulse may be calculated and converted to a distance that is indicative of the level of the liquid in the receptacle.

20 Claims, 15 Drawing Sheets

(58) Field of Classification Search
CPC ...... G01F 23/20; G01F 23/241; G01F 23/265;
G01F 23/266; G01F 23/28; G01F
23/2845; G01F 23/2927; G01F 23/30;
G01F 23/38; G01F 22/02; G01F 23/0046;
G01F 23/162; G01F 23/261; G01F
23/288; G01F 23/2928; G01F 23/303;
G01F 23/36; G01F 11/00; G01F 11/263;
G01F 15/0755; G01F 1/007; G01F 1/24;
G01F 23/0015; G01F 23/0023; G01F
23/0053; G01F 23/02; G01F 23/045;
G01F 23/16; G01F 23/185; G01F 23/226;
G01F 23/243; G01F 23/244; G01F
23/246; G01F 23/248; G01F 23/2885;
G01F 23/2965; G01F 23/2966; G01F
23/2968; G01F 23/32; G21C 17/035
USPC ...................................................... 73/290 R
See application file for complete search history.

(56) References Cited

U.S. PATENT DOCUMENTS

| | | | |
|---|---|---|---|
| 9,212,943 B2 | 12/2015 | Yamada et al. | |
| 9,395,227 B2 | 7/2016 | Kenjyo et al. | |
| 10,830,630 B2* | 11/2020 | Kesba | G01F 23/284 |
| 2004/0027137 A1* | 2/2004 | Sherrard | G01F 23/268 |
| | | | 324/644 |
| 2004/0036482 A1* | 2/2004 | Sherrard | G01F 23/284 |
| | | | 324/644 |
| 2010/0067643 A1 | 3/2010 | Tan et al. | |
| 2013/0177122 A1 | 7/2013 | Fushimi et al. | |
| 2016/0003662 A1 | 1/2016 | Dayal et al. | |
| 2016/0274234 A1* | 9/2016 | Nawrocki | G01F 23/2962 |
| 2016/0320226 A1* | 11/2016 | Schaefer | G01F 23/2962 |
| 2019/0063982 A1* | 2/2019 | Kesba | G01F 23/284 |
| 2019/0310125 A1* | 10/2019 | Farmanyan | G01F 23/284 |
| 2020/0217706 A1* | 7/2020 | Wildey | G01S 13/00 |

FOREIGN PATENT DOCUMENTS

| | | |
|---|---|---|
| JP | 2016-194422 | 11/2016 |
| WO | WO-2013073178 A1 | 5/2013 |

OTHER PUBLICATIONS

Search Report for corresponding European Application No. 20178307.3 dated Feb. 1, 2021.

* cited by examiner

1000

330

SYSTEM AND METHOD USING TIME-DOMAIN REFLECTOMETRY TO MEASURE A LEVEL OF A LIQUID

BACKGROUND

Field

The present disclosure relates to systems and methods for measuring a liquid level.

Description of Related Art

Conventionally, time-domain reflectometry (TDR) has been used to characterize and locate faults in metallic cables. Although there are time-domain reflectometry (TDR) based water level measurement systems, they are typically not designed to remotely measure water levels (e.g., in an operating boiling water reactor (BWR)) from relatively far distances by utilizing impulses and relatively highly specialized time-domain reflectometry (TDR) discrimination methods. For instance, one conventional time-domain reflectometry (TDR) system utilizes a step wave rather than impulse. Other conventional approaches include guided wave radar (GWR) techniques which use technology in this general category. However, all such conventional techniques require electronics in the vicinity (i.e., relatively close proximity) of the spent fuel pool (SFP) and, thus, are not suitable for water level measurement in a hostile environment which could include high radiation and/or high temperatures.

SUMMARY

A system for measuring a level of a liquid may include a receptacle, a probe, a pulsing unit, and a digitizer. The receptacle has a top and a bottom and is configured to contain the liquid. The probe may extend into the receptacle through the bottom. The pulsing unit is configured to transmit a pulse to the probe. The digitizer is configured to receive at least a first reflected pulse and a second reflected pulse from the probe.

The receptacle may be a reactor pressure vessel of a boiling water reactor. The reactor pressure vessel may include a top guide, a core plate, and fuel assemblies between the top guide and the core plate. The probe may extend through the core plate and the fuel assemblies. In addition, the reactor pressure vessel may include a local power range monitor (LPRM) tube. The probe may be disposed within the LPRM tube. The LPRM tube may be perforated so as to be pervious to the liquid in the receptacle.

The probe may be oriented vertically within the receptacle. The probe has an upper end and a lower end. The upper end may be within the receptacle. The lower end is configured to receive the pulse from the pulsing unit. The probe includes a conductive tube, at least one marker within the conductive tube, and at least one conductive rod coaxially arranged within the conductive tube and connected to the at least one marker. The conductive tube may be perforated so as to be pervious to the liquid in the receptacle.

The pulsing unit may be disposed at least 1000 feet away from the probe. The system may further comprise a coaxial cable connecting the probe to the pulsing unit and the digitizer. The coaxial cable may be configured to convey the pulse from the pulsing unit to the probe and to convey the first reflected pulse and the second reflected pulse from the probe to the digitizer. The first reflected pulse may be from an initial interface with the liquid at the bottom of the receptacle. The second reflected pulse may be from a liquid/air interface in the receptacle.

A method for measuring a level of a liquid in a receptacle may include inserting a probe into a bottom of the receptacle and through the liquid. In addition, the method may include transmitting a pulse to the probe. The method may also include receiving a first impedance mismatch in a form of a first reflected pulse from an initial interface with the liquid at the bottom of the receptacle. The method may also include receiving a second impedance mismatch in a form of a second reflected pulse from a liquid/air interface in the receptacle. The method may also include calculating a time between the first reflected pulse and the second reflected pulse. Furthermore, the method may include converting the time to a distance. The distance may be indicative of the level of the liquid in the receptacle.

The transmitting may include the pulse traveling upward through the liquid to the liquid/air interface. The transmitting may also include operating a transistor in avalanche mode to generate the pulse. The operating of the transistor may result in a Gaussian pulse having a magnitude of at least 5 volts and a width of 4 nanoseconds or less. The receptacle may be a reactor pressure vessel of a boiling water reactor, and the transmitting may be performed during normal operating or accident conditions.

The converting may include calculating a speed of the pulse through the probe with at least one marker that is disposed at a known distance from a lower end of the probe. The method may further comprise determining a temperature of the liquid based on the speed of the pulse.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
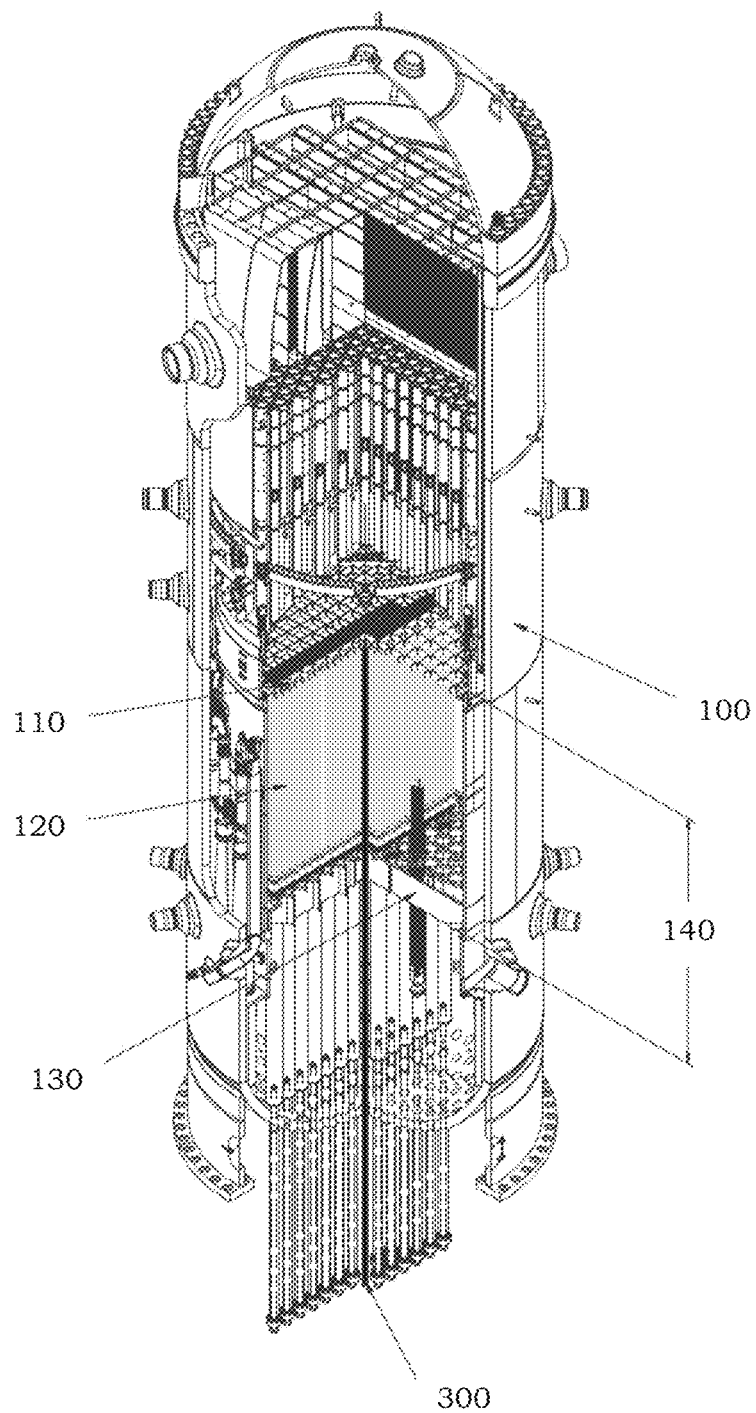
FIG. 1 is a cutaway view of a boiling water reactor (BWR) that includes a system for measuring a level of a liquid therein according to an example embodiment.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 is a cutaway view of a boiling water reactor (BWR) that includes a system for measuring a level of a liquid therein according to an example embodiment. Referring to FIG. 1, a system 1000 for measuring a level of a liquid may include a receptacle, a probe, a pulsing unit, and a digitizer. The receptacle has a top and a bottom and is configured to contain the liquid. The probe may extend into the receptacle through the bottom. The pulsing unit is configured to transmit a pulse to the probe. The digitizer is configured to receive at least a first reflected pulse and a second reflected pulse from the probe. The receptacle, the probe, the pulsing unit, and the digitizer will be discussed in more detail herein.

The receptacle may be a reactor pressure vessel (RPV) 100 of a boiling water reactor, although example embodiments are not limited thereto. The reactor pressure vessel 100 may include a top guide 110, a core plate 130, and fuel assemblies 120 between the top guide 110 and the core plate 130. The probe may be a time-domain reflectometry (TDR) probe 300 that extends into the reactor pressure vessel 100 through the bottom while also extending through the core plate 130 and the fuel assemblies 120. The region between the top guide 110 and the core plate 130 may be regarded as the fuel region 140. In one instance, the TDR probe 300 may terminate at the top guide 110 (e.g., when an existing boiling water reactor is retrofitted to include the system 1000) such that the upper end of the TDR probe 300 is below the level of the liquid in the reactor pressure vessel 100 during normal operating conditions and above the level of the liquid during accident conditions. In another instance, the TDR probe 300 may extend through the top guide 110 (e.g., for a new boiling water reactor integrated with the system 1000) such that the upper end of the TDR probe 300 is above the level of the liquid in the reactor pressure vessel 100 during normal operating and accident conditions.

Figure 2:
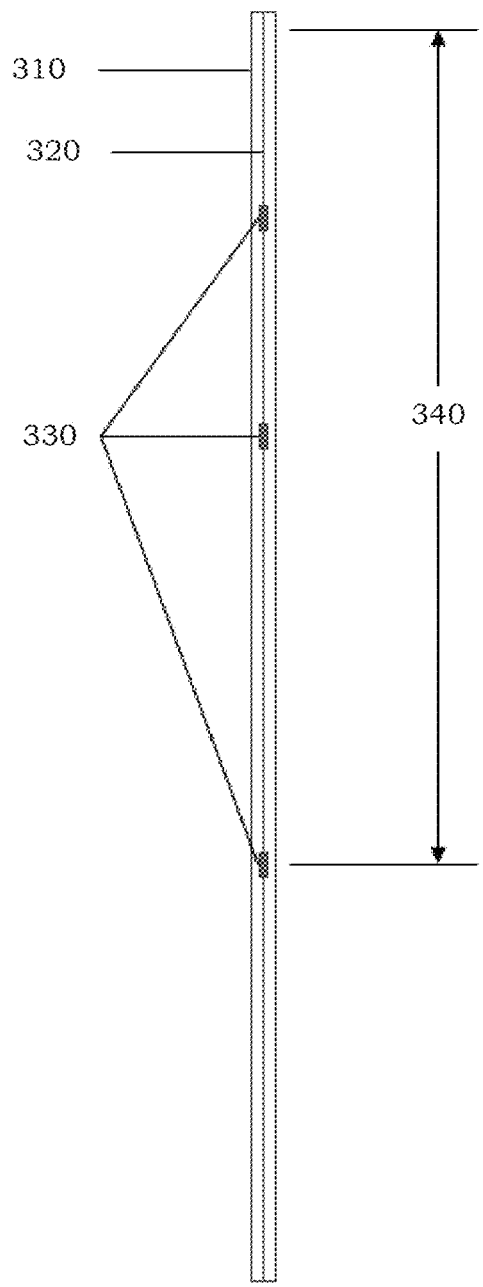
FIG. 2 is a schematic view of a time-domain reflectometry (TDR) probe according to an example embodiment.

FIG. 2 is a schematic view of a time-domain reflectometry (TDR) probe according to an example embodiment. Referring to FIG. 2, the TDR probe 300 includes a conductive tube 310, at least one marker 330 within the conductive tube 310, and at least one conductive rod 320 coaxially arranged within the conductive tube 310 and connected to the at least one marker 330. Although the TDR probe 300 is illustrated as including three markers 330, it should be understood that example embodiments are not limited thereto.

The TDR probe 300 has an upper end and a lower end. When installed, the upper end of the TDR probe 300 is within the receptacle. The lower end of the TDR probe 300 may also be within the receptacle. In an example embodiment, the upper end of the TDR probe 300 may be configured to extend through the fuel region 340 (when installed in a reactor pressure vessel). In addition, the conductive tube 310 of the TDR probe 300 may be perforated so as to be pervious to the liquid in the receptacle. As a result, the level of the liquid in the TDR probe 300 may be the same as the level of the liquid in the receptacle. The TDR probe 300 may also be oriented vertically within the receptacle.

The lower end of the TDR probe 300 is configured to receive a pulse from the pulsing unit. In addition, the pulse may be reflected along various locations of the TDR probe 300 such that reflected pulses are transmitted back to the digitizer. In one instance, a first reflected pulse may be from an initial interface with the liquid at the bottom of the receptacle. In another instance, a second reflected pulse may be from a liquid/air interface in the receptacle. As used herein, it should be understood that the liquid/air interface may also be referred to as a liquid/gas interface (e.g., water/steam interface). Additionally, as will be discussed in more detail herein, the reflected pulses may also be from the marker(s) 330 and/or the top of the TDR probe 300.

The pulsing unit and/or the digitizer may be disposed remotely relative to the TDR probe 300, which may be beneficial from a safety perspective for certain environments (e.g., nuclear reactor environments). For instance, the pulsing unit and/or the digitizer may be disposed at least 1000 feet away from the TDR probe 300, although example embodiments are not limited thereto. To permit this remote arrangement, a coaxial cable may be provided to connect the TDR probe 300 to the pulsing unit and the digitizer. As a result, the coaxial cable may be configured to convey the pulse from the pulsing unit to the TDR probe 300 and to convey at least the first reflected pulse and the second reflected pulse from the TDR probe 300 to the digitizer. The coaxial cable, pulsing unit, and digitizer will be discussed in more detail herein.

Figure 3:
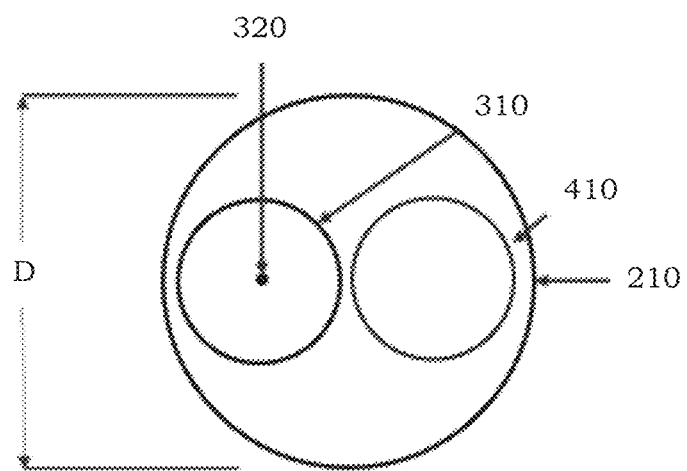
FIG. 3 is a cross-sectional view of a local power range monitor (LPRM) tube including a TDR probe according to an example embodiment.

FIG. 3 is a cross-sectional view of a local power range monitor (LPRM) tube including a TDR probe according to an example embodiment. Referring to FIG. 3, the local power range monitor (LPRM) tube 210 may be disposed within the reactor pressure vessel 100. For instance, the LPRM tube 210 may extend (e.g., vertically) into the reactor pressure vessel 100 through the bottom while also extending through the fuel region 140 (and, thus, through the core plate 130 and the fuel assemblies 120). The TDR probe 300 (which includes the conductive tube 310 and the conductive rod(s) 320) may be disposed within the LPRM tube 210. A traversing in-core probe (TIP) tube 410 may also be disposed within the LPRM tube 210 and arranged in parallel relative to the TDR probe 300, although example embodiments are not limited thereto. The LPRM tube 210 may be perforated so as to be pervious to the liquid in the reactor pressure vessel 100. As a result, the level of the liquid in the LPRM tube 210 may be the same as the level of the liquid in the reactor pressure vessel 100.

In an example embodiment, the LPRM tube 210 may have a diameter D ranging from 0.8 to 1.2 inches (e.g., 1 inch). In addition, the conductive tube 310 (of the TDR probe 300) and the TIP tube 410 may each have a diameter ranging from 0.350 to 0.400 inch (e.g., 0.375 inch). Furthermore, the conductive rod 320 of the TDR probe 300 may have a diameter ranging from 0.035 to 0.045 inch (e.g., 0.040 inch).

Figure 4:
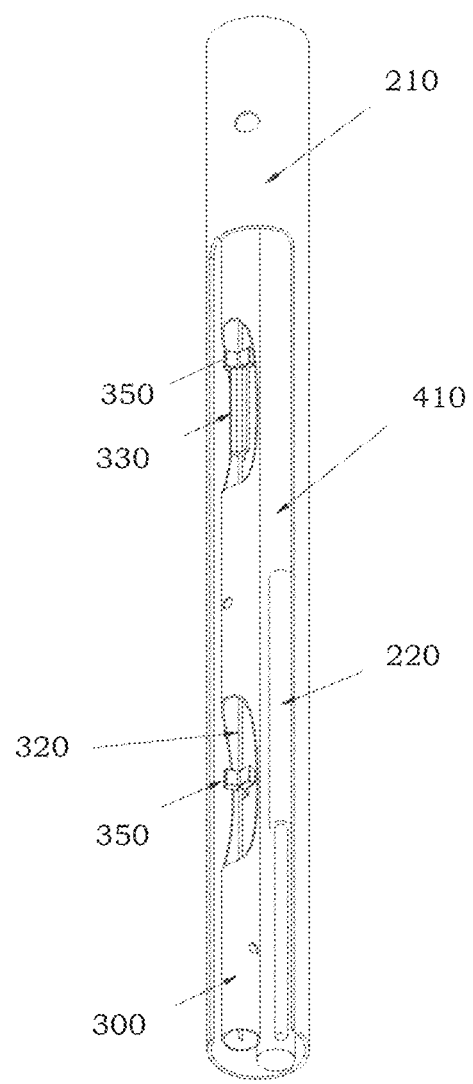
FIG. 4 is a cutaway view of a LPRM tube including a TDR probe according to an example embodiment.

FIG. 4 is a cutaway view of a LPRM tube including a TDR probe according to an example embodiment. Referring to FIG. 4, the TDR probe 300, the TIP tube 410, and a LPRM detector 220 are disposed within the LPRM tube 210. With regard to the TDR probe 300, a plurality of spacers 350 may be provided within to help maintain a relatively equal distance (e.g., coaxial arrangement) between the conductive rod 320 and the conductive tube 310 of the TDR probe 300. Each of the spacers 350 define a through hole through which the conductive rod 320 extends. Each of the spacers 350 may also include three radially-arranged fins which may contact an inner surface of the conductive tube 310 of the TDR probe 300, although example embodiments are not limited thereto. In addition, each of the spacers 350 may be formed of an insulating material (e.g., ceramic). Furthermore, at least one marker 330 may be positioned at a known distance from the bottom of the TDR probe 300. As a result, a reflected pulse by the marker 330 may be used to calculate additional information (e.g., pulse propagation speed). The marker 330 will be discussed in more detail herein.

Figure 5:
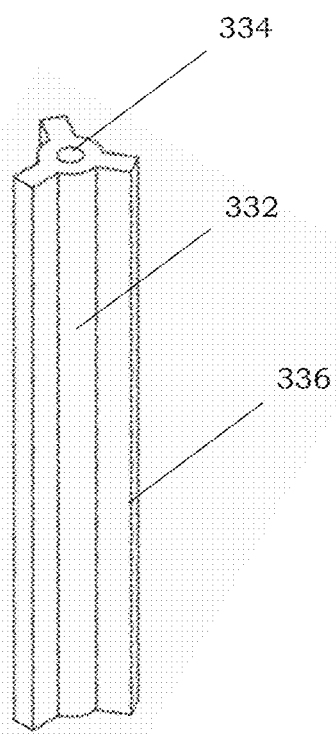
FIG. 5 is a perspective view of a marker of a TDR probe according to an example embodiment.

FIG. 5 is a perspective view of a marker of a TDR probe according to an example embodiment. Referring to FIG. 5, the marker 330 includes a body portion 332 and a plurality of fin portions 336. The body portion 332 of the marker 330 defines a blind hole 334 (e.g., at each end) configured to accommodate the conductive rod(s) 320 of the TDR probe 300. Where only one marker 330 is utilized, the at least one conductive rod in the TDR probe 300 may be in a form of two conductive rods 320 connected to the marker 330 via the blind holes 334 at each end. Where a plurality, such as three, markers 330 are utilized (e.g., FIG. 2), the at least one conductive rod in the TDR probe 300 may be in a form of four conductive rods 320 alternately connected to the markers 330 in a serial and coaxial manner via the blind holes 334 of each marker 330. Thus, when the number of markers 330 is n, the number of conductive rods 320 may be n+1. In some instances, the marker(s) 330, if utilized, may be integrally formed with the conductive rod 320.

The body portion 332 of the marker 330 may have a cylindrical form, and the plurality of fin portions 336 may be radially-arranged and equidistantly-spaced while extending along the length of the body portion 332. For instance, the fin portions 336 may extend along the full length of the body portion 332 so as to be flush with the ends of the body portion 332. The marker 330 may also be a monolithic structure wherein the body portion 332 is integrally formed with the plurality of fin portions 336. Although three fin portions 336 are illustrated in the drawings, it should be understood that example embodiments are not limited thereto.

The marker 330 is configured to cause a reflected pulse to be transmitted back to the digitizer (in response to the initial pulse from the pulsing unit) as a result of an impedance mismatch between the conductive rod 320, the marker 330, and the conductive tube 310. The impedance mismatch may be from resistive, capacitive, and/or inductive differences. To ensure that a reflected pulse of adequate width and amplitude is generated (to facilitate detection), the marker 330 may have a length that ranges from about 1 to 3 inches (e.g., 2 inches). In one instance, the conductive rod 320 and the marker 330 may be formed of the same conductive material (e.g., stainless steel). In another instance, the conductive rod 320 may be formed of one conductive material (e.g., platinum), while the marker 330 may be formed of a different conductive material (e.g., stainless steel). In either situation, the impedance mismatch may stem from at least the change in geometry with regard to the conductive rod 320 and the marker 330.

Figure 6:
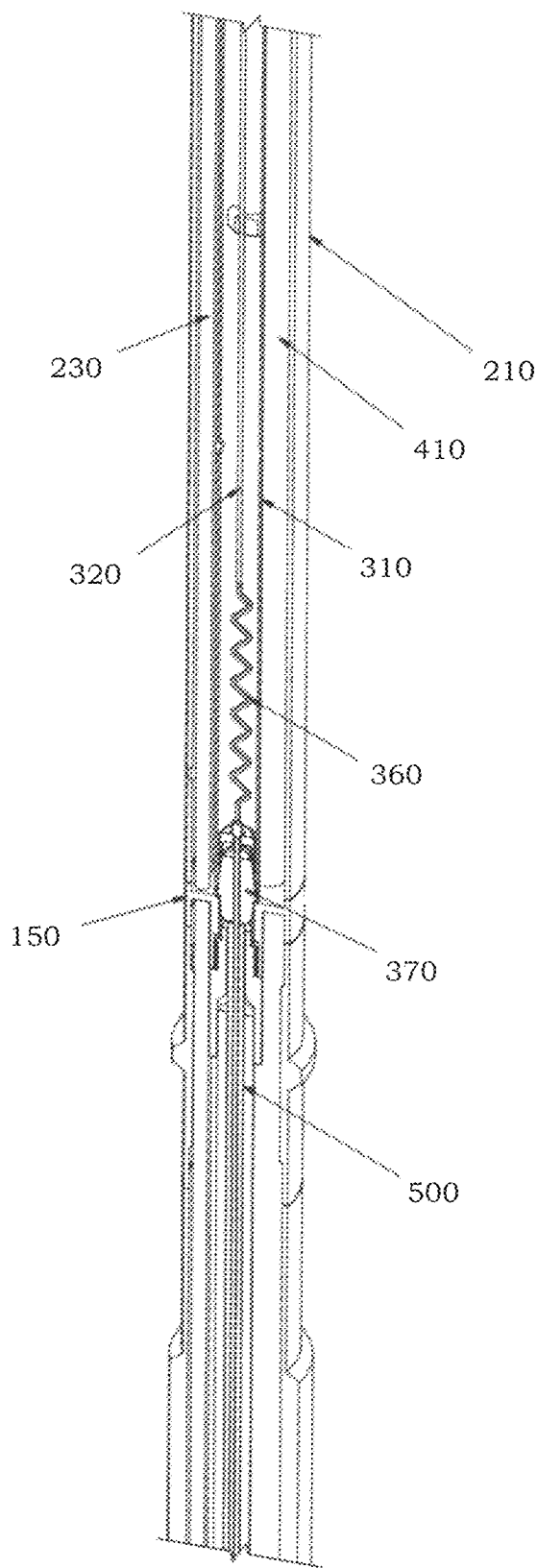
FIG. 6 is a cross-sectional view of a LPRM tube including a TDR probe according to an example embodiment.

FIG. 6 is a cross-sectional view of a LPRM tube including a TDR probe according to an example embodiment. Referring to FIG. 6, the LPRM tube 210 includes the TDR probe 300 (which includes the conductive tube 310 and the conductive rod 320), the TIP tube 410, and a LPRM cable 230. When installed, the structures in the vicinity of the boundary 150 (which may be a plate) may be within the reactor pressure vessel. A seal 370 is provided at the end of the TDR cable 500. The seal 370 may be formed of ceramic and configured to be liquid-tight and capable withstanding relatively high pressures. A stress-relief structure 360 may be utilized to mitigate strain caused by thermal expansion. Although the stress-relief structure 360 is shown as being in a zig-zag form, it should be understood that example embodiments are not limited thereto. For instance, in the alternative, the stress-relief structure 360 may have a spiral or helical form. The TDR cable 500 may be regarded as being part of the coaxial cable that is connected to the pulsing unit and the digitizer. For instance, the TDR probe 300, the pulsing unit, and the digitizer may be connected via a plurality of cable segments that are collectively referred to as a coaxial cable.

Figure 7:
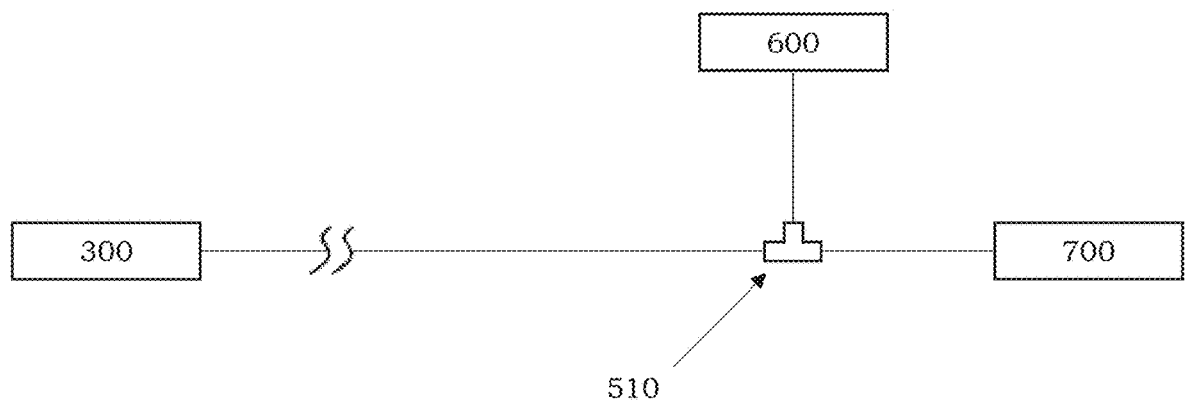
FIG. 7 is a schematic view of the connection of the TDR probe to the pulsing unit and the digitizer according to an example embodiment.

FIG. 7 is a schematic view of the connection of the TDR probe to the pulsing unit and the digitizer according to an example embodiment. Referring to FIG. 7, the TDR probe 300 is connected to the pulsing unit 600 and the digitizer 700 via a tee 510. For instance, the TDR probe 300 may be connected to the tee 510 with a first segment of the coaxial cable. The pulsing unit 600 may be connected to the tee 510 with a second segment of the coaxial cable. The digitizer 700 may be connected to the tee 510 with a third segment of the coaxial cable. The tee 510 may be a BNC (Bayonet Neill-Concelrnan) connector, although example embodiments are not limited thereto. As noted supra, the pulsing unit 600 is configured to transmit a pulse to the TDR probe 300. The digitizer 700 is configured to receive reflected pulses from the TDR probe 300 and to produce digital representations of the reflected pulses. The digitizer 700 may include an analog-to-digital converter (ADC) and may be implemented in a computer. Although not specifically shown in FIG. 7, a process control card (PCC) may be used as a switch.

Figure 8:
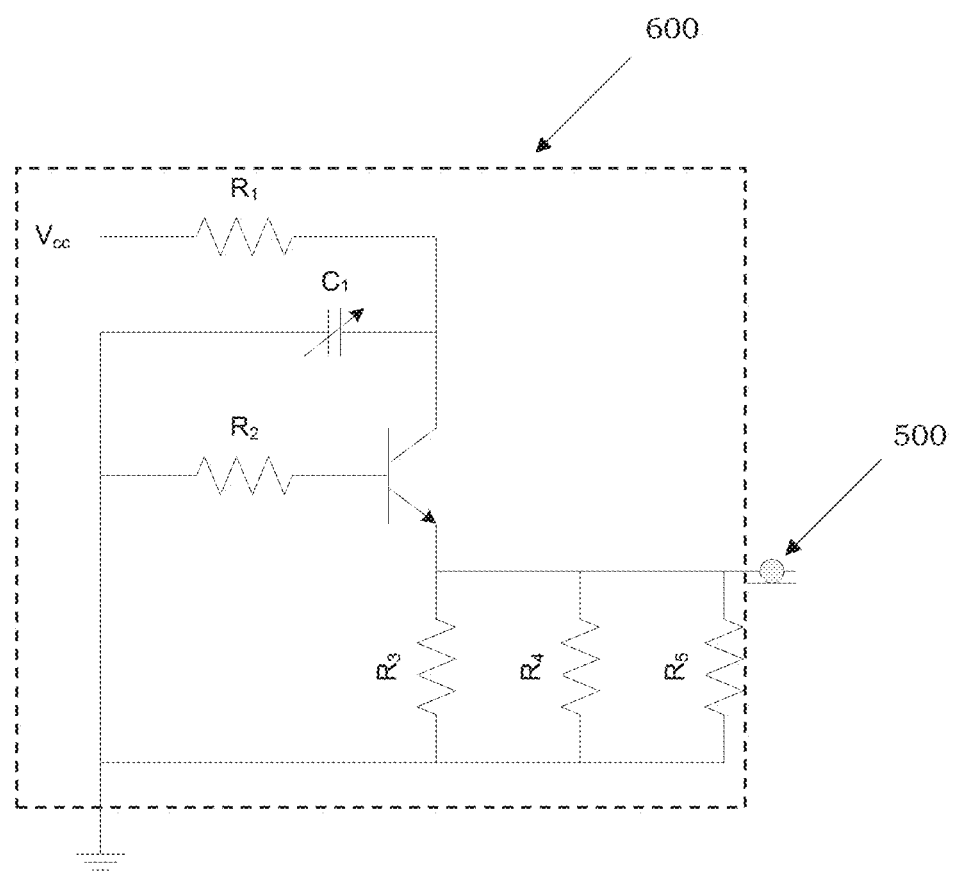
FIG. 8 is a schematic view of a pulsing unit and TDR cable according to an example embodiment.

FIG. 8 is a schematic view of a pulsing unit and TDR cable according to an example embodiment. Referring to FIG. 8, the pulsing unit 600 is configured to produce a short electrical pulse (as opposed to a longer step-like waveform) that is transmitted to the TDR probe 300 via a TDR cable 500. The use of a short electrical pulse allows for the temporal separation of reflections from various features of the TDR probe 300. As a result, automated detection algorithms may be used to analyze the reflections. In contrast, with longer step-like waveforms, the reflections from the various features of the TDR probe 300 tend to interfere with each other, thus frustrating their detection.

In an example embodiment, the pulse exhibits both fast rise and fall times to ensure minimal interference between the different reflections. For instance, the pulsing unit 600 may produce Gaussian pulses with the required fast rise and fall times. However, due to skin effects (e.g. of the TDR cable 500 and/or the conductive rod 320), shorter pulses may be more rapidly attenuated than longer pulses. Thus, in addition to pulse width, the signal level should also be considered to ensure robust operation. For instance, the pulsing unit 600 may produce a 5-15 V pulse into a 75 Ohm cable.

The pulsing unit 600 may include a transistor that is configured to operate in avalanche mode to generate a pulse. The transistor may be a bipolar junction transistor (BJT) with a base, collector, and emitter as terminals. In the avalanche mode, a positive voltage is applied to the collector until the collector-to-emitter breakdown voltage (e.g., 110 V) is exceeded. When the collector-to-emitter breakdown voltage is exceeded, a pulse of current flows from the collector to the emitter. The rise and fall times of the pulse are each in the sub-nanosecond range.

Resistor R1 and Capacitor C1 form a resistor-capacitor (RC) network which may serve the following purposes. The relative values of R1 and C1 affect the rate of voltage buildup on the collector of the transistor. The transistor enters avalanche mode when the voltage builds up to a sufficiently high value. The size of C1 also affects the width of the resulting avalanche. A higher value of C1 will cause the avalanche to last for a longer time interval, because more charge is present on C1 at the start of the avalanche. Conversely, a lower value of C1 will cause the avalanche to last for a shorter time interval, because less charge is present on C1 at the start of the avalanche. Thus, the pulse width is selectable based on the value of C1. The pulsing unit 600 may produce relatively consistent 1-3 nanosecond wide pulses.

The transistor has a relatively low parasitic capacitance value with low inherent collector-to-emitter leakage. The low parasitic capacitance allows for the creation of a relatively high amplitude narrow pulse. In addition, the low inherent collector-to-emitter leakage prevents the premature onset of an avalanche when the RC network formed by R1 and C1 is being charged. Without a low inherent collector-to-emitter leakage, the discharge may not be prompt, thereby resulting in a longer rise time for the pulse.

Resistor R2 is configured to facilitate the termination of the avalanche in a relatively clean manner (e.g., with no bounce). Resistors R3, R4, and R5 may have multiple functions. In an example embodiment, the parallel resistance formed by R3, R4, and R5 matches the output impedance of the pulsing unit 600 to the impedance of the TDR cable 500. In addition, the pulse (which is generated when the avalanche occurs) flows through the parallel resistance formed by R3, R4, and R5 to develop the TDR pulse voltage. Although not shown in FIG. 8, a resistor R6 may also be included together with R3, R4, and R5 to form the parallel resistance. Use of parallel resistors is also beneficial, because the multiple circuit paths increase the surface area available for the avalanche current to reach ground. This minimizes both the skin effect losses and the self-inductance effects. Minimizing the skin effect losses helps to increase the amplitude of the resultant pulse. Minimizing the self-inductance effects results in a more rapid avalanche which also helps to increase the amplitude of the resultant pulse. The more rapid avalanche may help to generate a narrow pulse.

As will be discussed in more detail herein, a method for measuring a level of a liquid in a receptacle (e.g., reactor pressure vessel 100) may include inserting a probe (e.g., TDR probe 300) into a bottom of the receptacle and through the liquid. In addition, the method may include transmitting a pulse to the probe. The method may also include receiving a first impedance mismatch in a form of a first reflected pulse from an initial interface with the liquid at the bottom of the receptacle. The method may also include receiving a second impedance mismatch in a form of a second reflected pulse from a liquid/air interface in the receptacle. The method may also include calculating a time between the first reflected pulse and the second reflected pulse. Furthermore, the method may include converting the time to a distance, the distance being indicative of the level of the liquid in the receptacle.

The transmitting may include the pulse traveling upward through the liquid to the liquid/air interface. The transmitting may also include operating a transistor in avalanche mode to generate the pulse. The operating of the transistor may result in a Gaussian pulse having a magnitude of at least 5 volts and a width of 4 nanoseconds or less. The receptacle may be a reactor pressure vessel of a boiling water reactor, and the transmitting may be performed during normal operating or accident conditions.

The converting may include calculating a speed of the pulse through the probe with at least one marker (e.g., marker 330) that is disposed at a known distance from a lower end of the probe. The method may further comprise determining a temperature of the liquid based on the speed of the pulse.

Figure 9:
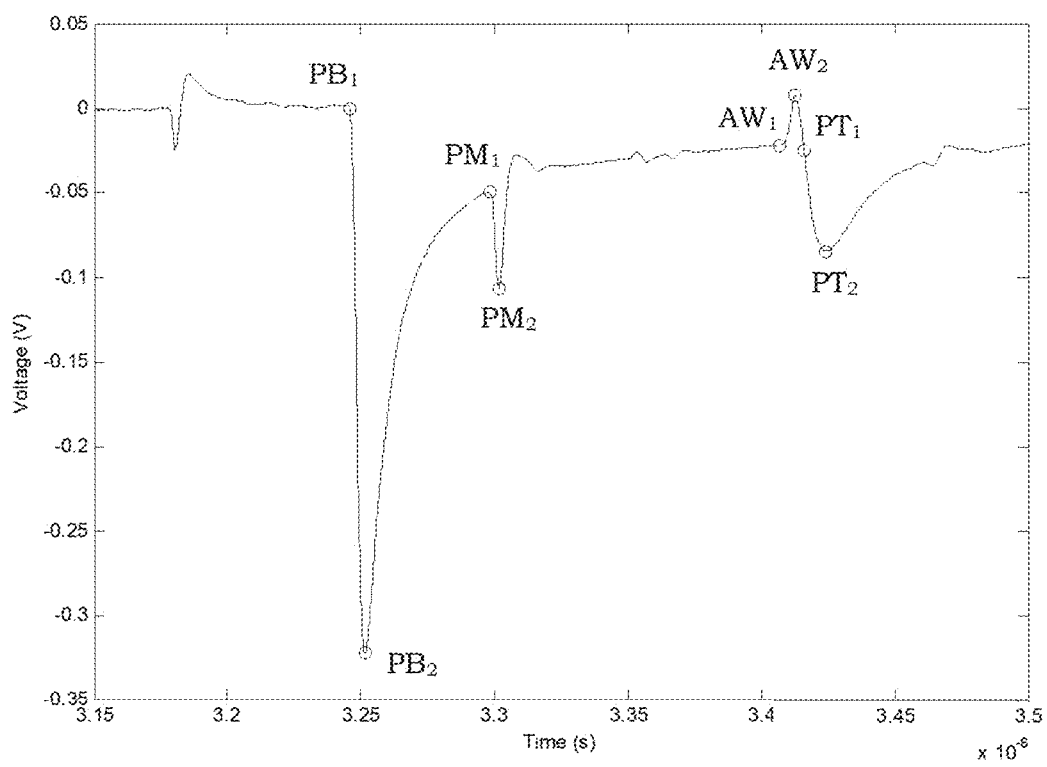
FIG. 9 is a voltage versus time TDR signature of the reflections during a method for measuring a level of a liquid according to an example embodiment.
Figure 10:
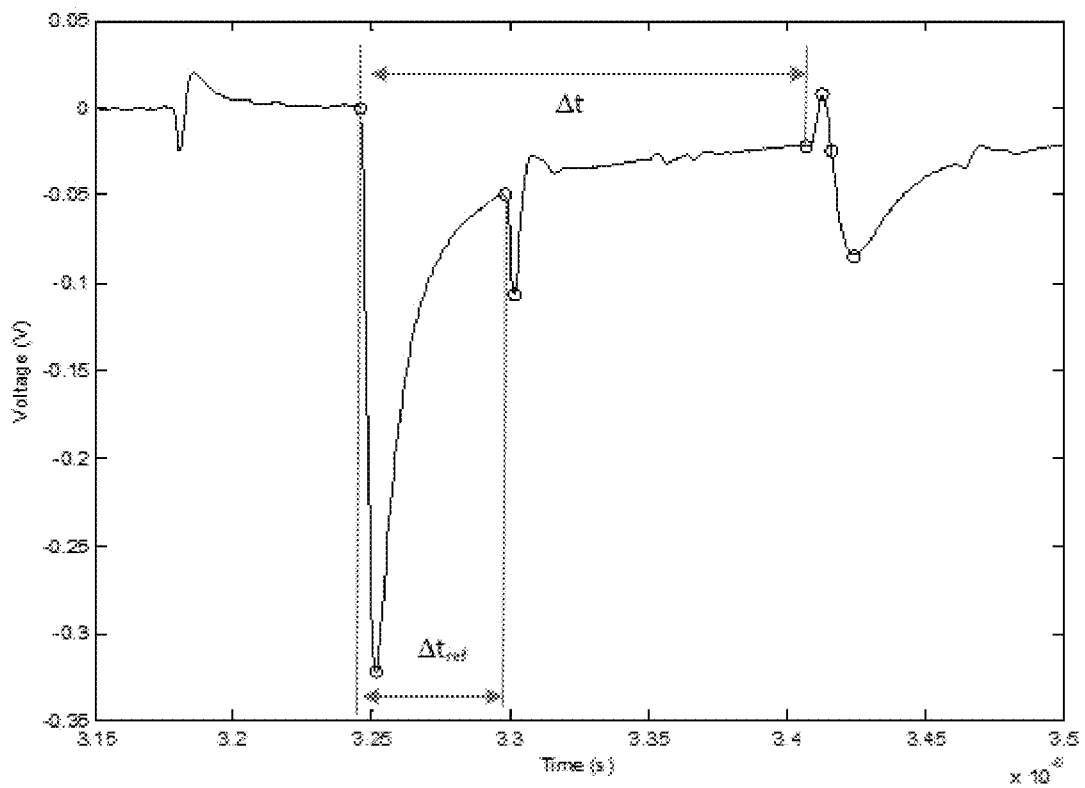
FIG. 10 is a voltage versus time TDR signature of the reflections during a method for measuring a level of a liquid with a showing of the relevant time differences according to an example embodiment.

FIG. 9 is a voltage versus time TDR signature of the reflections during a method for measuring a level of a liquid according to an example embodiment. FIG. 10 is a voltage versus time TDR signature of the reflections during a method for measuring a level of a liquid with a showing of the relevant time differences according to an example embodiment. Referring to FIGS. 9-10, the raw data used to determine the liquid level (e.g., water level) is obtained from the digitized reflections of the initial pulse from the pulsing unit (e.g., pulsing unit 600) off the probe (e.g., TDR probe 300). The signature (which may also be referred to as a trace) of the reflections shown in the drawings may include an average of 100 individual signatures captured at a pulse rate of 50 kHz and at a temperature of 550° F. with a 29 cm air gap at the top of the probe, although example embodiments are not limited thereto.

In FIGS. 9-10, the reflections shown correspond to various features of the probe, including the bottom of the probe, the marker(s), the air/water interface, and the top of the probe. Each reflection may be characterized by two points: the start of the reflection (where it lifts off or otherwise departs from the local baseline) and the peak of the reflection. With regard to the bottom of the probe, the start of the reflection is labeled PB1, while the peak of the reflection is labeled PB2. With regard to the marker (assuming one marker), the start of the reflection is labeled PM1, while the peak of the reflection is labeled PM2. With regard to the air/water interface, the start of the reflection is labeled AW1, while the peak of the reflection is labeled AW2. With regard to the top of the probe, the start of the reflection is labeled PT1, while the peak of the reflection is labeled PT2.

Software may be used to automatically detect the reflections and corresponding features of the probe, which may include the bottom of the probe, the marker(s), the air/water interface (if any), and the top of the probe. In an example embodiment, for each reflection and corresponding feature, the software determines the location in time of the start of the reflection and the peak (amplitude) of the reflection. The start point of the reflection is defined as where the reflection lifts off or otherwise departs away from the local baseline. The start point may be found using an edge detection method. This method uses digital filters based on Gaussian derivatives which are optimized for each feature and digitally convolved with the data. This technique may dramatically increase the signal-to-noise ratio over standard finite difference techniques. Threshold detection is then used to determine when the filtered response exceeds a predetermined level. This technique is especially useful for detecting the reflections and corresponding features in the presence of noise. Once the start (or edge) of the reflection and corresponding feature is detected, the peak (amplitude) of the reflection is determined by a simple maximum/minimum value search near the edge.

As will be discussed in more detail herein, the edge detection method may include three steps. The first step of the edge detection method may involve filter definition. The second step of the edge detection method may involve convolution of the filter with the raw data (or preprocessed data). The third step of the edge detection method may involve detection of the features (peaks) in the filtered data.

With regard to the first step of the edge detection method, the filters are based on the following Gaussian equation.

$$G(x) = \frac{1}{\sqrt{2\pi}\,\sigma} \exp\left[\frac{-(t-\mu)^2}{2\sigma^2}\right] \tag{1}$$

In Equation 1, μ is the centroid. In addition, σ is related to the scale width of the filter (the full width half maximum (FWHM) of the Gaussian), as set forth below.

$$\sigma = \frac{FWHM}{2.355} \tag{2}$$

The scale width is related to the "size" of the feature in the data that is being sought. All constants are in the units of the ordinate (time) of the TDR signature data (t, V). The scale width tunes the filter to enhance features in the signature of that "size" or FWHM time duration. Although the method is not overly sensitive to the scale width selected, smaller or larger features in the TDR signal are de-emphasized in the filtered response. This is what makes the method more useful than typical finite difference techniques.

An edge filter is defined to be the first derivative of the Gaussian, as set forth below.

$$E(x) = \left(\frac{-(t-\mu)}{\sigma^2}\right)\exp\left[\frac{-(t-\mu)^2}{2\sigma^2}\right] \tag{3}$$

The edge filter also tends to remove any DC component (e.g., the "back porch") which makes threshold detection more robust.

Implementation of the filter involves a centroid that is centered to the right of the first data point. A convenient center location may be at a distance that is seven times the full width half maximum (FWHM). This is allows the filter ordinate to be positive and does not truncate the left side of the filter. The selection of the filter scale size should be selected with the size of the feature in mind. In an example embodiment, the FWHM for the TDR features are 13 ns for the top and bottom probe reflections, 5 ns for the marker reflection, and 4 ns for the air/water interface reflections. These are determined by taking the FWHM of the reflections in the TDR signature.

Figure 11:
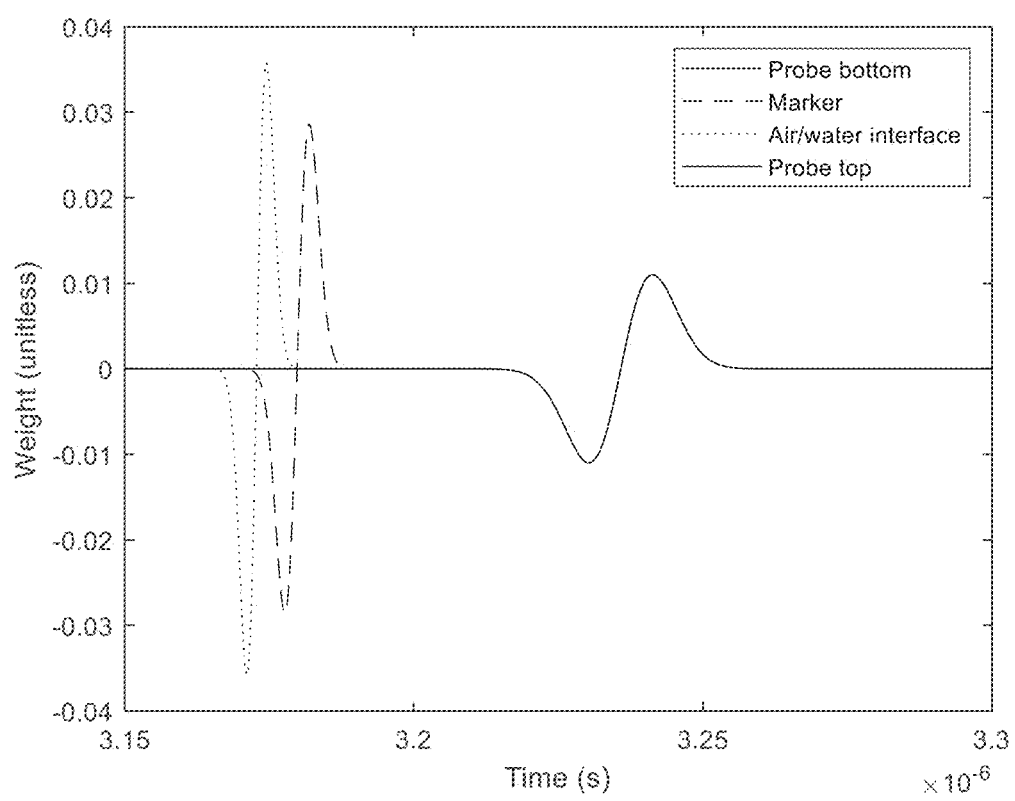
FIG. 11 shows edge filters for convolution with the data according to an example embodiment.

FIG. 11 shows edge filters for convolution with the data according to an example embodiment. Referring to FIG. 11, four Gaussian edge detection filters are shown. On the left is the air/water interface edge filter, which is shown by a dotted line (.....). To the right of the air/water interface edge filter is the marker edge filter, which is shown by a dashed line (_ _ _). Further to the right are the probe top edge filter and the probe bottom edge filter, which are shown by solid lines (_____) As shown, the probe top edge filter and the probe bottom edge filter are the same.

With regard to the second step of the edge detection method, the mathematical convolution of two one-dimensional functions is defined by the following equation.

$$O(x) = \int_{x'} (x-x') I(x') dx' \quad (4)$$

The convolution of each filter with the TDR signature from the probe produces various responses, which will be discussed in more detail herein.

Figure 12:
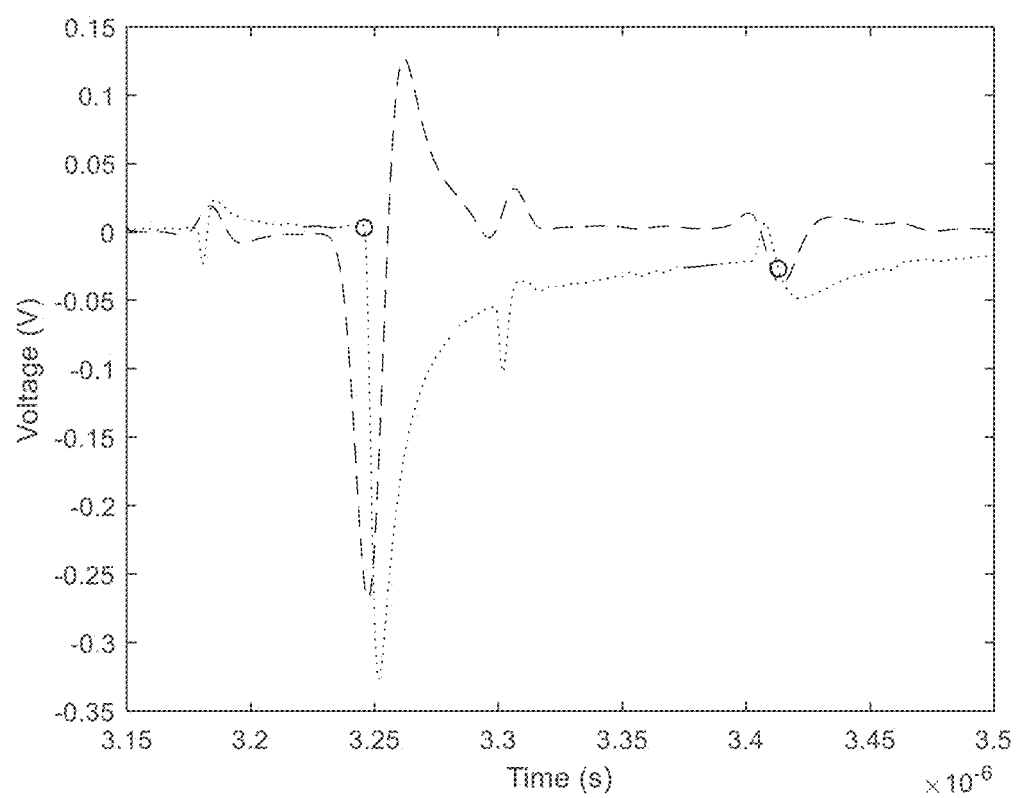
FIG. 12 shows the convolution of the probe top edge filter and the probe bottom edge filter with the data according to an example embodiment.

FIG. 12 shows the convolution of the probe top edge filter and the probe bottom edge filter with the data according to an example embodiment. Referring to FIG. 12, the TDR signature from the probe (FIG. 9) is shown along with the filtered response. The threshold for feature detection may be −0.05 volts. In addition, a local region of interest for defining a separate noise threshold may be identified (e.g., solid portion of dotted line). The start times of the probe top reflection and the probe bottom reflection determined by the software are indicated by the circles on the TDR signature.

Figure 13:
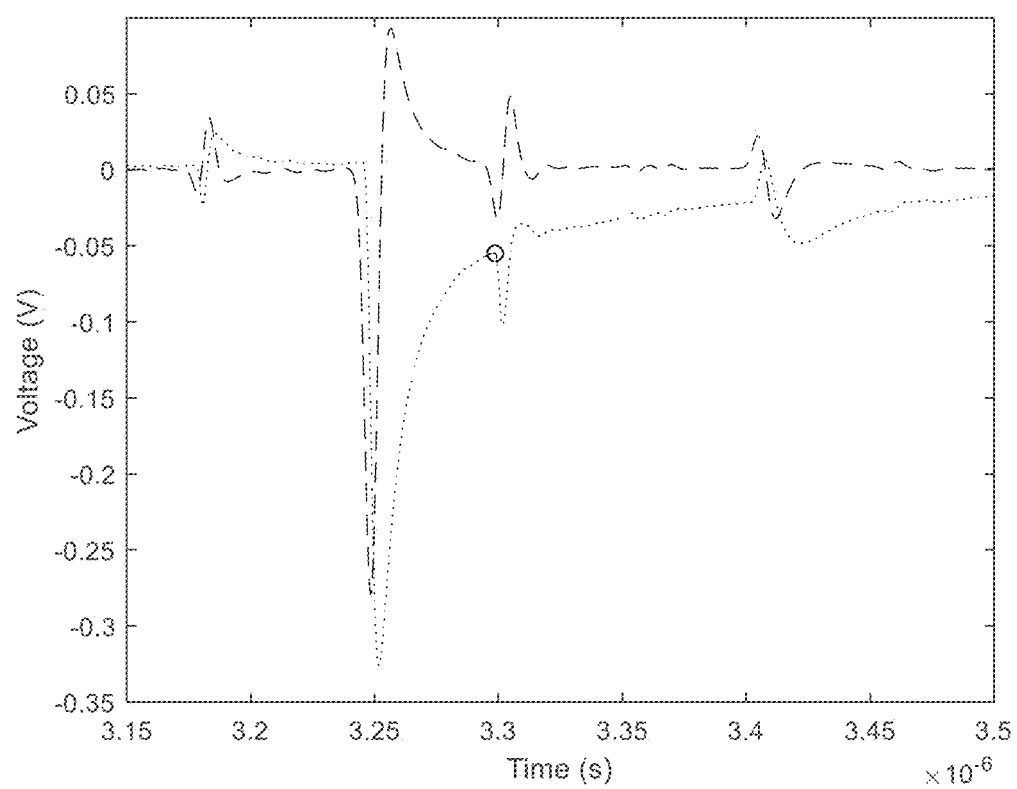
FIG. 13 shows the convolution of the marker edge filter with the data according to an example embodiment.

FIG. 13 shows the convolution of the marker edge filter with the data according to an example embodiment. Referring to FIG. 13, the TDR signature from the probe (FIG. 9) is shown along with the filtered response. The threshold for feature detection may be −0.01 volts. In addition, the local region of interest for locating the maximum voltage value corresponding to the start of the marker reflection may be identified (e.g., solid portion of dotted line overlapping with the circle). The start time of the marker reflection determined by the software is indicated by the circle on the TDR signature.

Figure 14:
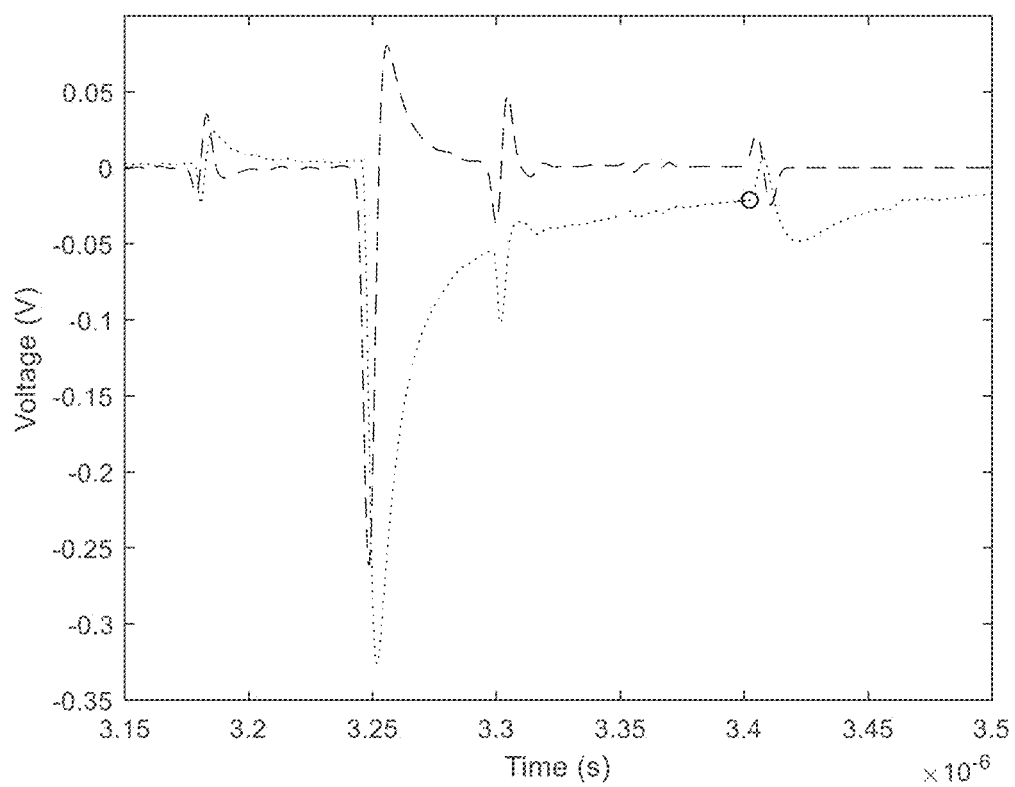
FIG. 14 shows the convolution of the air/water interface edge filter with the data according to an example embodiment.

FIG. 14 shows the convolution of the air/water interface edge filter with the data according to an example embodiment. Referring to FIG. 14, the TDR signature from the probe (FIG. 9) is shown along with the filtered response. The threshold for feature detection may be 0.006 volts. In addition, a local region of interest for defining a separate noise threshold may be identified (e.g., solid portion of dotted line overlapping with the circle). The start time of the air/water interface reflection determined by the software is indicated by the circle on the TDR signature.

With regard to the third step of the edge detection method, once the start (or edge) of the reflection is detected, the peak (amplitude) of the reflection is determined by a simple maximum/minimum value search near the edge. The maximum (or minimum) in the filtered response may correspond to the location of the midpoint of the leading (or falling) edge of the reflection. However, it should be noted that, because the TDR reflections may not be symmetric (e.g., the leading edge and the falling edge have different slopes), the location may be slightly skewed from the exact midpoint location. Since the output of the convolution is relatively smooth, the method of peak detection may involve finding the minimum or maximum value in the filtered response over a threshold. The thresholds used for each feature were discussed above in connection with FIGS. 12-14. A strategy may be to set the threshold to the lowest value that does not trip on unwanted peaks in the filtered response. This may be particularly applicable for the air/water interface reflection where the search is for the minimum up-peak just over the background noise.

The proper selection for the starting point and ending point of the search will increase the likelihood of accurately locating the marker reflection and the air/water interface reflection. In an example embodiment, the marker is located 6 feet from the bottom of the probe. In such a scenario, an appropriate starting point is after the peak of the probe bottom reflection. For instance, a starting point may be selected to be two probe bottom FWHMs after the start of the probe bottom reflection. The ending point for the marker reflection may be selected to be 100 ns after the starting point. The air/water interface reflection may be assumed to be located before the probe top reflection. As a result, this region may be defined based on the location of the start of the probe top reflection and may extend two probe top FWHMs before it.

Once the midpoint of the leading edge (or approximate location) is found, the next task is to find the point of lift off or departure from the local baseline in the TDR signature (the beginning or start of the reflection). This may be accomplished by moving backwards in time from the midpoint until the TDR signal falls below a local noise threshold. The noise threshold may be determined from the statistics of a local region of interest in the TDR signature. The starting location of this local region of interest may be two FWHMs before the midpoint. However, for the probe top reflection, the starting location may be three FWHMs before the midpoint to remove any possible interference from an air/water interface reflection (if any). The length in time may be one FWHM. The average and standard deviation of the voltage in this region of interest is determined. The local noise threshold is defined as the average plus or minus three standard deviations. The plus or minus sign depends on whether the reflection is positive or negative.

The marker reflection may be a down-pulse located on the "back porch" of the probe bottom reflection. At high temperatures (e.g., 550° F.), there may be a relatively large slope of the local background in the region where the marker reflection is located (the "back porch"). As a result (and as described supra), the first search may be for the negative peak of the filtered response. The threshold is set for that domain (expected filtered response magnitude) and, consequently, the middle of the fall of the marker reflection in the TDR signal is found. Next, a walk backwards in time from this location in the original TDR signal (the unfiltered time-voltage signal) is performed until a maximum peak in the voltage is found. The extent of the region of interest for the search may be limited to one marker FWHM before the middle of the fall of the marker reflection. In this region (see FIG. 13), the time location (plus one time step) of the maximum voltage corresponds to the start of the marker reflection. In sum, the location of a reflection's peak value may be performed by searching for a minimum (or maximum) in the TDR signature within three FWHMs of the starting point of the reflection.

Once the above features (e.g., in connection with the four reflections) are located in the TDR signal, information about the conditions in the probe may be determined. Such conditions in the probe may include the pulse propagation speed in the liquid (e.g., water), the liquid temperature, and the liquid level.

The liquid (e.g., water) level may be determined by measuring the difference in time between the reflection at the bottom of the probe and the reflection at the air/water interface (if any). If no air/water interface reflection is detected, then the probe may be assumed to be full of water. On the other hand, if an air/water interface reflection is detected, then the time difference is determined from the beginning of each reflection (where the reflection lifts off or otherwise departs from the local baseline). This time difference is then multiplied by the pulse propagation speed in water to calculate the length of the water region from the bottom of the probe.

Since the pulse propagation speed in water is sensitive to water temperature (which is expected vary to some extent over the axial height in-core), it may be beneficial to have a direct measurement of this speed. In this regard, providing the probe with one or more markers may allow more information to be obtained about how the pulse propagation speed varies along different regions of the probe due to anticipated temperature variations. Additionally, such information may be available every data update cycle. With regard to positioning, the marker(s) is/are placed at a known location(s) from the bottom (and/or top) of the probe. By measuring a time difference between the probe bottom reflection and the marker reflection, the pulse propagation speed for this region may be determined.

With a single marker placed at the start of the core region, three possible pulse propagation speeds are available: 1) the plenum region speed (between the probe bottom and marker), 2) the core region speed (between the marker and the probe top), and 3) the probe average speed (between the probe bottom and the probe top). The plenum region speed is potentially available every update cycle, while the core region speed and the probe average speed are only available when the probe is full. Regardless of the manner of measurement, the speed is representative of the conditions between each reference point and the time it was last updated.

The pulse propagation speed in water is a direct function of the water density. In addition, the water density is a strong function of temperature (and a weak function of pressure). The dependence of the pulse propagation speed on water temperature suggests a potentially important new measurement capability using TDR. Notably, the direct measurement of the local propagation speed can be related to the local water temperature. This may be implemented using a look-up table relating the pulse propagation speed and water temperature. As a result, each measurement of pulse propagation speed may be converted to water temperature (e.g., plenum region, core region, and probe average). As with speed, the temperature is representative of the conditions between each reference point and the time it was last updated. If there is a significant variation in the water temperature above the marker, then the determination of the water level may result in a conservative water level measurement (e.g., if the temperature in the core is hotter than in the plenum region).

Figure 15:
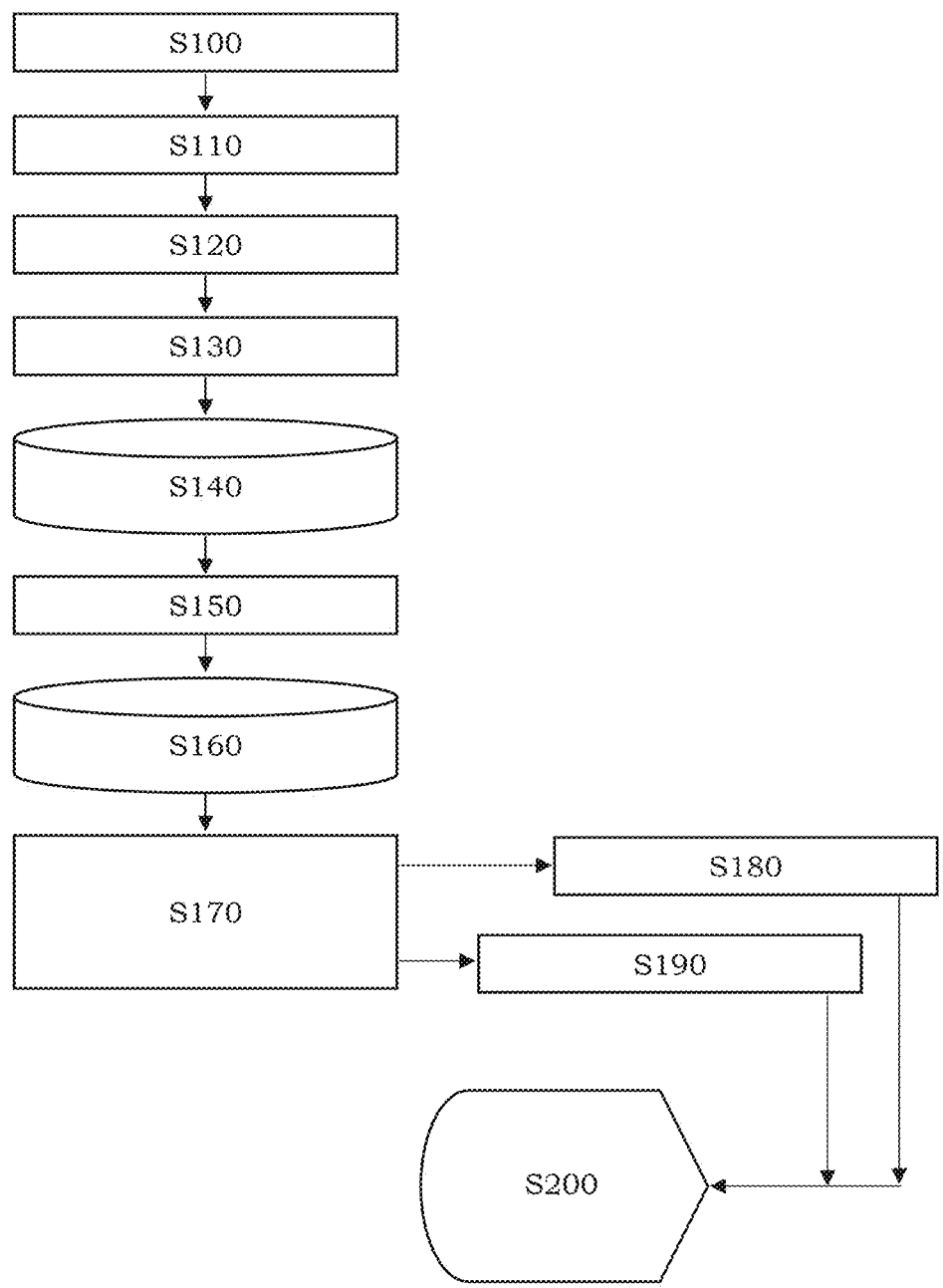
FIG. 15 is a flow chart of a method for measuring a level of a liquid using TDR data according to an example embodiment.

FIG. 15 is a flow chart of a method for measuring a level of a liquid using TDR data according to an example embodiment. Referring to FIG. 15, the method may include Steps S100-S200, which are discussed below.

In Step S100, the TDR reflection data for the probe is obtained. The probe may be the TDR probe 300 in FIG. 1, and the TDR reflection data may be along the lines of the TDR signature discussed herein.

In Step S110, Gaussian edge filters may be convolved with the TDR reflection data. The Gaussian edge filters may include the probe bottom edge filter, the marker edge filter, the air/water interface edge filter, and the probe top edge filter in FIG. 11.

In Step S120, the peak in the convolved data may be found by simple thresholding for each feature, which may include the probe bottom, marker(s), air/water interface (if any), and probe top.

In Step S130, the location in time is found where each feature lifts-off (or otherwise departs) from the local baseline in the TDR reflection data, as shown in FIGS. 12-14.

In Step S140, the time and voltage of the start of each feature from the TDR reflection data is recorded.

In Step S150, the location in time of the peak value of each feature is found.

In Step S160, the time and voltage of the peak of each feature from the TDR reflection data is recorded.

In Step S170, the pulse propagation velocity is calculated in the regions between each marker and the probe top and the probe bottom. As discussed supra, the positions of each marker, the probe top, and the probe bottom (and, thus, the distances in between) are known. As a result, the pulse propagation velocity may be calculated once the time difference between the reflections of a region are determined.

In Step S180, the water temperature may be determined by correlation of the pulse propagation velocity in each region. For instance, the water temperature may be determined from look-up tables based on the pulse propagation velocity. The look-up tables may be obtained from empirical studies.

In Step S190, the water level may be determined using the detected features and pulse propagation velocities. For instance, the time difference between the probe bottom reflection and the air/water interface reflection (e.g., Δt in FIG. 10) may be multiplied by the pulse propagation speed to calculate the length of the water region from the probe bottom to the air/water interface (surface of the water).

In Step S200, the results may be displayed and recorded. The results may include the water level and regional water temperatures.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A system for measuring a level of a liquid, comprising:
a receptacle configured to contain the liquid, the receptacle having a top and a bottom;
a probe extending into the receptacle through the bottom, the probe including a conductive tube, at least one marker within the conductive tube, and at least one conductive rod coaxially arranged within the conductive tube and connected to the at least one marker;
a pulsing unit configured to transmit a pulse to the probe; and
a digitizer configured to receive at least a first reflected pulse and a second reflected pulse from the probe.

2. The system of claim 1, wherein the probe is oriented vertically within the receptacle.

3. The system of claim 1, wherein the probe has an upper end and a lower end, the lower end configured to receive the pulse from the pulsing unit.

4. The system of claim 3, wherein the upper end of the probe is within the receptacle.

5. The system of claim 1, wherein the conductive tube is perforated so as to be pervious to the liquid in the receptacle.

6. The system of claim 1, wherein the first reflected pulse is from an initial interface with the liquid at the bottom of the receptacle, and the second reflected pulse is from a liquid/air interface in the receptacle.

7. The system of claim 1, wherein the pulsing unit is disposed at least 1000 feet away from the probe.

8. The system of claim 1, further comprising:
a coaxial cable connecting the probe to the pulsing unit and the digitizer, the coaxial cable configured to convey the pulse from the pulsing unit to the probe and to convey the first reflected pulse and the second reflected pulse from the probe to the digitizer.

9. The system of claim 1, wherein the receptacle is a reactor pressure vessel of a boiling water reactor.

10. The system of claim 1, wherein the at least one marker includes a body portion and a plurality of fin portions.

11. A system for measuring a level of a liquid, comprising:
a receptacle configured to contain the liquid, the receptacle having a top and a bottom;
a probe extending into the receptacle through the bottom;
a pulsing unit configured to transmit a pulse to the probe; and
a digitizer configured to receive at least a first reflected pulse and a second reflected pulse from the probe,
wherein the receptacle is a reactor pressure vessel of a boiling water reactor, and the reactor pressure vessel includes a local power range monitor (LPRM) tube, the probe disposed within the LPRM tube.

12. The system of claim 11, wherein the LPRM tube is perforated so as to be pervious to the liquid in the receptacle.

13. A system for measuring a level of a liquid, comprising:
a receptacle configured to contain the liquid, the receptacle having a top and a bottom;
a probe extending into the receptacle through the bottom;
a pulsing unit configured to transmit a pulse to the probe; and
a digitizer configured to receive at least a first reflected pulse and a second reflected pulse from the probe,
wherein the receptacle is a reactor pressure vessel of a boiling water reactor, and the reactor pressure vessel includes a top guide, a core plate, and fuel assemblies between the top guide and the core plate, the probe extending through the core plate and the fuel assemblies.

14. A method for measuring a level of a liquid contained in a receptacle having a top and a bottom, comprising:
transmitting, with a pulsing unit, a pulse to a probe extending into the receptacle through the bottom of the receptacle and through the liquid, the probe including a conductive tube, at least one marker within the conductive tube and at least one conductive rod coaxially arranged within the conductive tube and connected to the at least one marker;
receiving, with a digitizer, a first impedance mismatch in a form of a first reflected pulse from an initial interface with the liquid at the bottom of the receptacle;
receiving, with the digitizer, a second impedance mismatch in a form of a second reflected pulse from a liquid/air interface in the receptacle;
calculating a time between the first reflected pulse and the second reflected pulse; and
converting the time to a distance, the distance being indicative of the level of the liquid in the receptacle.

15. The method of claim 14, wherein the transmitting includes the pulse traveling upward through the liquid to the liquid/air interface.

16. The method of claim 14, wherein the transmitting includes operating a transistor in avalanche mode to generate the pulse.

17. The method of claim 16, wherein the operating results in a Gaussian pulse having a magnitude of at least 5 volts and a width of 4 nanoseconds or less.

18. The method of claim 14, wherein the receptacle is a reactor pressure vessel of a boiling water reactor, and the transmitting is performed during normal operating or accident conditions.

19. The method of claim 14, wherein the converting includes calculating a speed of the pulse through the probe with at least one marker that is disposed at a known distance from a lower end of the probe.

20. The method of claim 19, further comprising:
determining a temperature of the liquid based on the speed of the pulse.

* * * * *